(12) United States Patent
Rosenthal

(10) Patent No.: US 6,208,718 B1
(45) Date of Patent: Mar. 27, 2001

(54) EMERGENCY INTERRUPT TECHNIQUE

(75) Inventor: Eugene J. Rosenthal, Edison, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/124,125

(22) Filed: Jul. 29, 1998

(51) Int. Cl.$^7$ .................................................. H04M 11/00
(52) U.S. Cl. ...................................... 379/93.35; 379/218
(58) Field of Search ................................... 379/93.35, 37, 379/45, 46, 48, 218

(56) References Cited

U.S. PATENT DOCUMENTS

| | | | | |
|---|---|---|---|---|
| 5,651,060 | * | 7/1997 | Cohn et al. ........................ | 379/93.35 |
| 5,805,587 | * | 9/1998 | Norris et al. ...................... | 379/93.35 |
| 5,809,128 | * | 5/1999 | McMullin .......................... | 379/93.35 |
| 5,905,788 | * | 5/1999 | Bauer et al. ............................ | 379/48 |
| 5,982,774 | * | 11/1999 | Foladare et al. ..................... | 379/218 |
| 6,104,800 | * | 8/2000 | Benson ............................... | 379/93.35 |

* cited by examiner

*Primary Examiner*—Stella Woo
(74) *Attorney, Agent, or Firm*—Eugene J. Rosenthal

(57) ABSTRACT

A user on a data call, e.g., to the Internet, is prevented from establishing a data call immediately after an emergency interrupt has been initiated, and the fact that the emergency interrupt took place is brought to his attention. This is necessary because otherwise the emergency interrupt is likely to be perceived by a user connected to the Internet as simply a dropped line, in response thereto the user is likely to simply originate a new call to the ISP, and so may never become aware that there has been an attempt to bring to his attention, via the emergency interrupts, an extraordinary circumstance. The invention achieves this by transmitting from the telephone network a signal which is recognizable by the user's modem and which indicates that an emergency interrupt took place. Such an emergency-interrupt-occurred signal may be transmitted upon the occurrence of the emergency interrupt or after the line next goes off-hook. Such a signal may be in addition to or in lieu of dial tone. In response to detection thereof the user's modem may take appropriate action. For example, the modem will not initiate the dialing out for the next attempt to connect the ISP, but instead, the modem will hang up, so that an incoming call can be received. Furthermore, the auto answer mode of the modem may be disabled temporarily.

69 Claims, 1 Drawing Sheet

EMERGENCY INTERRUPT TECHNIQUE

TECHNICAL FIELD

This invention relates to the data communication, and more particularly, to data communication that cannot be disrupted under ordinary circumstances.

BACKGROUND OF THE INVENTION

For households and other locations served by only a single telephone line, when that telephone line is utilized for data communication, e.g., via modem, call waiting, if subscribed to, is typically disabled. This disabling is often performed by the dialing software, which dials an appropriate prefix code for disabling call waiting before dialing the telephone number at which is located the remote device with which the data communication will take place.

When the data communication is for purposes of enabling a user to communicate with remote sites via the Internet, the data communication session can take a long time, e.g., several hours, or longer. Because of a) transmission errors, b) delays in communication over the Internet, c) problems at the Internet service provider (ISP) to which the call was placed for access to the Internet, d) software errors, and e) the like, one may become disconnected from the Internet, with the connection to the ISP being dropped. During peak usage periods, and under other situations, such disconnection may occur several times during an Internet session, and, in fact, several such disconnects may occur within a relatively short period of time, e.g., within several minutes of each other. When one gets disconnected, there is a tendency to simply redial to reestablish the connection. This can be done very quickly using the dialing software, which, typically, also is combined with automatic logon software.

Since there is only one telephone line, and call waiting has been disabled or is not provisioned therefor, it is ordinarily not possible to reach the user by telephone while the user is engaged on the Internet session. This is because, by virtue of the lack of call waiting, the connection from the user to the ISP will not be disturbed by an incoming call and any caller will receive a busy signal. Consequently, in the event of an extraordinary circumstance, such as an emergency, the only resort of a party needing to contact the user by telephone is to call the telephone company and arrange for an operator to attempt an emergency interrupt for the user's telephone line.

SUMMARY OF THE INVENTION

I have recognize that such an emergency interrupt is likely to be perceived by the user as merely a dropped connection. Since a dropped connection could have occurred because of any of the above-noted causes, which are more likely causes of a dropped connection than an emergency interrupt, it is unlikely that the user would recognize that an emergency interrupt has, or is, occurring. This is especially true if the speaker of the modem, which may be bridged on the telephone line, is turned off after the initial establishment of the data connection, as is typically done.

Therefore, if the user was disconnected because of an emergency interrupt, he would not be aware of this, and instead, if his session was not yet completed, he would originate a new call to the ISP. This is typically achieved by having the modem go on-hook, then substantially immediately go back off-hook and redial the telephone number of the ISP. With the automated dialing software, this procedure can be performed very quickly. As a result, the user may never become aware that there has been an attempt to bring to his attention, via the emergency interrupt, an extraordinary circumstance.

Therefore, in accordance with the principles of the invention, the fact that the emergency interrupt took is now taking, or has recently taken, place is made more likely to be brought to the user's attention. This may be achieved by the user's modem recognizing a signal from the communications network that indicates that an emergency interrupt has taken, or is taking, place. The modem may then take appropriate action. The signal may be a specially defined signal transmitted by the network or it may be speech energy which is received from the network and detected when speech energy is otherwise not expected to be on the telephone line at a particular time. The action taken may include preventing the user from establishing a data call substantially immediately after an emergency interrupt has been initiated or activating the speaker of the modem while the emergency interrupt is taking place.

In one embodiment of the invention, after the line is interrupted by an emergency interrupt a signal indicating that an emergency interrupt occurred is transmitted when the line next goes off-hook. This signal may be in addition to or in lieu of dial tone, and it is detectable by the user's modem, which can then take appropriate action in response to its detection. For example, in response to the emergency-interrupt-occurred signal the modem will not initiate the dialing out for the next attempt to connect the ISP, and instead, the modem will hang up, so that an incoming call can be received. In accordance with an aspect of the invention, the auto answer mode of the modem may also be disabled temporarily. As a result, another call attempt to the user's telephone number, either by an operator as part of the emergency interrupt procedure, or by those attempting to reach the user after the emergency interrupt procedure is completed, will require the telephone to be answered by some other device which, preferably, will be a telephone connected to the telephone line that is picked up by the user. If the user picks up the telephone, he will become aware of the attempt to reach him and the emergency circumstance that necessitated it. The modem may be reenabled after either a) a predetermined period, b) detecting that there was an incoming call answered by another device, or c) resetting the modem, e.g., by cycling power to it.

In accordance with another aspect of the invention, the modem is equipped with a speech detector and the speaker in the modem is connected through to the telephone line if speech energy is detected thereon after the data connection is dropped. The checking for speech energy may be performed substantially immediately upon the dropping of the connection to the Internet or prior to initiating the next call attempt, or both, so that in the event the user attempts to reconnect to the ISP, if the operator, or another, is connected on the line and is speaking when the modem initiates the call, the speaker in the modem is connected through to the telephone line so the user can hear the speech and become aware of the emergency interrupt condition. The speech detector may also be activated in the event the modem automatically answers a call within a period of time after a data connection is dropped regardless of the user selected mode for speaker usage on automatic answer.

In accordance with another aspect of the invention, if a dial tone is not detected when the user attempts to reconnect to the ISP within a predetermined period of time after having been disconnected from a previous data connection on the same telephone line for which call waiting was disabled or not provisioned, in addition to the conventional message of the type indicating that there is no dial tone and that the user should check all the connections, an additional message is displayed indicating that an emergency interrupt might have, or currently be, taking place and the user should delay reconnecting and endeavor to find out if someone is attempting to reach him.

DETAILED DESCRIPTION

Figure 1:
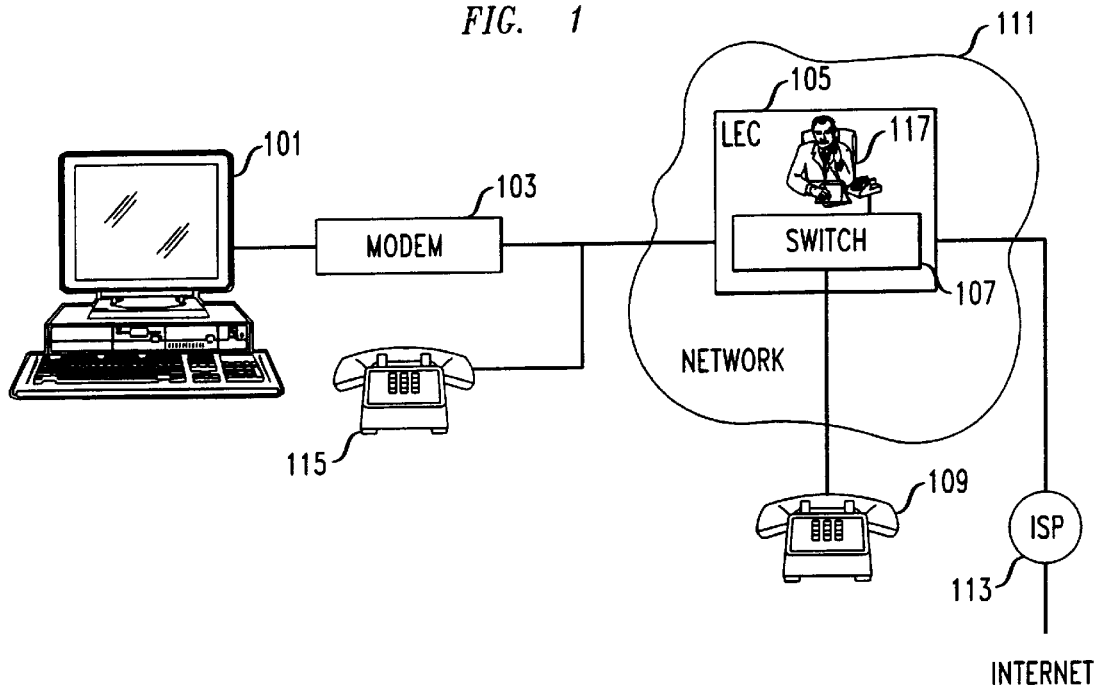
FIG. 1 shows a data communications arrangement which operates in accordance with the principles of the invention to make it more likely that an emergency interrupt which took place is brought to a user's attention.

The following merely illustrates the principles of the invention. It will thus be appreciated that those skilled in the art will be able to devise various arrangements which, although not explicitly described or shown herein, embody the principles of the invention and are included within its spirit and scope. Furthermore, all examples and conditional language recited herein are principally intended expressly to be only for pedagogical purposes to aid the reader in understanding the principles of the invention and the concepts contributed by the inventor to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams herein represent conceptual views of illustrative circuitry embodying the principles of the invention. Similarly, it will be appreciated that any flow charts, flow diagrams, state transition diagrams, pseudocode, and the like represent various processes which may be substantially represented in computer readable medium and so executed by a computer or processor, whether or not such computer or processor is explicitly shown.

The functions of the various elements shown in the FIGs., including functional blocks labeled as "processors", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, read-only memory (ROM) for storing software, random access memory (RAM), and non-volatile storage. Other hardware, conventional and/or custom, may also be included. Similarly, any switches shown in the FIGS. are conceptual only. Their function may be carried out through the operation of program logic, through dedicated logic, through the interaction of program control and dedicated logic, or even manually, the particular technique being selectable by the implementor as more specifically understood from the context.

In the claims hereof any element expressed as a means for performing a specified function is intended to encompass any way of performing that function including, for example, a) a combination of circuit elements which performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. Applicant thus regards any means which can provide those functionalities as equivalent as those shown herein.

FIG. 1 shows a data communications arrangement which operates in accordance with the principles of the invention to make it more likely that an emergency interrupt which took place is brought to a user's attention. This may be achieved by, for example, preventing the user from establishing a data call substantially immediately after an emergency interrupt has been initiated or activating the speaker of a user's modem while the emergency interrupt is taking place. Shown in FIG. 1 are a) computer 101, b) modem 103, c) local exchange (LEC) 105, d) telephone switch 107, c) telephones 109 and 115, f) network 111, g) Internet service provider (ISP) 113, and h) attendant position 117.

Computer 101 is employed by a user for data communication, e.g., over the Internet or an Internet-like network, such as an intranet. In order to achieve such data communication computer 101 employs modem 103 to a) convert data signals into signals that can pass through network 111 and b) to receive and decode such signals.

More specifically, modem 103 is a modem that is designed to operate in accordance with the principles of the invention. Modem 103 may be a so-called "internal" modem, which is located within the case of computer 101. Alternatively, modem 103 may be a so-called external modem, which is located external to the case of computer 101, typically within its own housing, and is connected to computer 101 by a cable, often an RS-232 serial cable. An embodiment of modem 103 in accordance with the principles of the invention is described more fully hereinbelow.

Network 111 is a telephone-type network. For example, network 111 may include elements of the public switched telephone network (PSTN), private network elements, such as private branch exchanges (PBXs), and/or other elements. Network 111 may include wired, optical, and/or wireless elements. In the embodiment of the invention shown in FIG. 1 network 111 includes at least LEC 105, and LEC 105 in turn includes at least telephone switch 107, which is arranged to operate in accordance with aspects of the invention. Those of ordinary skill in the art will be able to apply the principles of the invention to their own network configurations which may differ substantially from network 111 as shown in FIG. 1.

The signals from modem 103 pass through network 111 to ISP 113, and ultimately, to various so-called "sites" on the Internet, which are typically hosted by various server computers connected to the Internet, and back therefrom. Note that ISP 113 may be located within network 111, as may be the host servers of various ones of the sites. The communication channel between computer 101 and ISP 113 is maintained essentially continuously for the duration of a communication session initiated by a user of computer 101.

Because call waiting signals interfere with data communications via the telephone network when using at least one modem, the user of computer 101 typically does not have call waiting provisioned on the telephone line connected to modem 103, or he disables it as part of the initial setting up of the data communication session with ISP 113. Such disabling may be achieved by dialing a code, e.g., *70, prior to dialing the digits necessary to specify the called party, e.g., ISP 113. In the event a caller at telephone 109 wishes to reach the user of computer 101 via telephone 115 during the data communication session, the caller will receive a busy signal and the data communication session will continue uninterrupted when, as described herein, call waiting is not provisioned, or it is disabled.

If an emergency situation arises, the caller at telephone 109 may endeavor to have an operator, e.g., at attendant position 117, perform an emergency interrupt. Such an emergency interrupt involves disconnecting the call between modem 103 and ISP 113 or barging onto the call, e.g., by the operator. Note that such barging-on likely will result in the connection between modem 103 and ISP 113 being dropped because of the interference it causes with the data communication. Thereafter the caller at telephone 109 may be patched directly through to the telephone line connecting modem 103 to switch 107. Alternatively, the call between modem 103 and ISP 113 is disconnected, either by the operator or by modem 113, and a call, which may be operator-assisted, is placed from the caller at telephone 109 to the telephone line connected to modem 103.

Had the user at computer 101 been using for communication a telephone, e.g., telephone 115, rather than computer 101 and modem 103, he would have immediately become aware of the emergency interrupt condition, as he would have heard the operator, and possibly even the new caller. However, in the prior art, such as where a prior art modem is substituted for modem 103, network 111 is a prior art network, or where the features that support the invention are not enabled in modem 103 or network 111, because the call was placed by modem 103 the user will not hear anything upon the occurrence of the emergency interrupt. This is because modem 103 will go on-hook when the connection between modem 103 and ISP 113 is dropped as a result of the disturbance of the data communication caused by the emergency interrupt, and during normal data communication most users of a modem have its internal speaker off. Therefore, the user merely believes that connection was dropped because of any one of the more likely reasons for a lost connection, such as a) transmission errors, b) delays in communication over the Internet, c) problems at ISP 113 to which the call was placed for access to the Internet, d) software errors, and e) the like.

Consequently, the user is unaware of the emergency interrupt, and so he instructs computer 101 to cause modem 103 to reestablish the connection with ISP 113. This is typically achieved by having modem 103 go on-hook, which it may have done automatically, as noted above, upon the dropping of the connection, and then substantially immediately go back off-hook and redial the telephone number of ISP 113. With automated dialing software that may be executed by computer 101, the entire reconnection procedure can be performed very quickly. During this process, once modem 103 drops the connection the operator at attendant position 117 may report to the caller at telephone 109 that the telephone line is now clear, i.e., has gone on-hook, and that the caller at telephone 109 may now place a call normally to telephone 115. Nevertheless, because of the speed at which the reconnection process proceeds, by the time the caller at telephone 109 places the call, modem 103 may have already taken the telephone line off-hook and disabled call waiting again if the line is provisioned with it. Thus, modem 103 has prevented the desired emergency communication since the telephone line has again attained a busy status with respect to a call from telephone 109. As a result, the user of computer 101 may never become aware that there has been an attempt to bring to his attention, via the emergency interrupt, an extraordinary circumstance.

Figure 2:
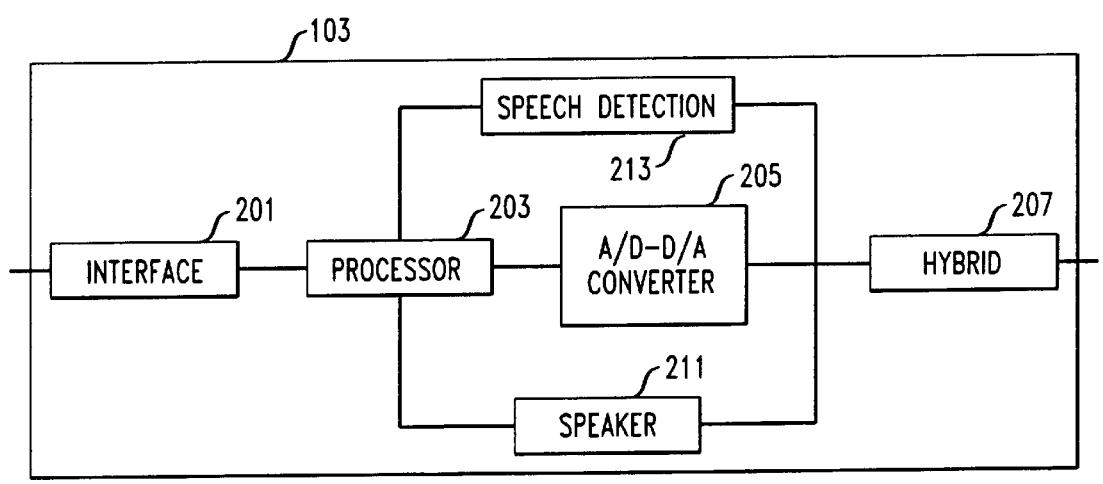
FIG. 2 shows an exemplary embodiment of the modem shown in FIG. 1 arranged in accordance with the principles of the invention.

FIG. 2 shows an exemplary embodiment of modem 103 arranged in accordance with the principles of the invention. In the embodiment of modem 103 shown in FIG. 2, modem 103 includes a) interface 201, b) processor 203, c) analog-to-digital and digital-to-analog (A/D-D/A) converter 205, d) hybrid 207, e) tone unit 209, f) speaker 211, and g) optional speech detection unit 213.

Interface 201 communicates digitally with computer 101. Typically, for external modems, interface 201 is a serial interface, although it is not required to be a serial interface. Similarly, for internal modems, interface 201 is often a parallel, bus-type, interface, although it may appear to software in computer 101 as a serial port. Various commands, messages and data may be exchanged via interface 201 with computer 101.

Processor 203 connects interface 201 and A/D-D/A converter 205. Processor 203 operates to control the overall operation of modem 103 and perform most of its functions. In particular, processor 203 encodes the data received from interface 201 and converts it to symbols that are transmitted over the telephone line by A/D-D/A converter 205. Similarly, processor 203 performs the processing necessary to extract data received from the telephone line and which is converted into digital form by A/D-D/A converter 205, and supplies the extracted data to interface 201.

Processor 203 also controls the operation of tone unit 209, as well as receives indications from tone unit 209 of the signals that are arriving on the telephone line. Note that tone unit 209 is shown as a separate unit interfaced to processor 203 and A/D-D/A converter 205 primarily for pedagogical purposes. This is because the functionality of tone unit 209 may, although it need not, be incorporated within processor 203 and A/D-D/A converter 205.

Note that processor 203 may be implemented by the microprocessor of computer 101. In such an embodiment of the invention, interface 201 may be eliminated.

In accordance with the principles of the invention, particular signals from network 111, e.g., by LEC 105 or switch 107, may be detected by modem 103 in the event of an emergency interrupt initiated by attendant 117 in response to a request by a user at telephone 109. These signals are detected 1) by tone unit 209, and an indication of their detection is indicated to processor 203; 2) directly by processor 203; or 3) by optional speech detection unit 213, and an indication of their detection is indicated to processor 203.

Regardless of the manner of detection, in response to detection of the signal, in one embodiment of the invention, the user is prevented from establishing a data call substantially immediately after an emergency interrupt has been initiated, and the fact that the emergency interrupt took place is made more likely to be brought to the user's attention. This prevention may be brought about by modem 103 acting alone or in concert with computer 101, e.g., in cooperation with the automatic dialing software contained therein.

In one embodiment of the invention, to effectuate preventing, the user from establishing a data call immediately after the line is interrupted by an emergency interrupt, a signal indicating that an emergency interrupt occurred is transmitted from network 111, typically from a switch thereof, which may, but need not be, switch 107. This signal may be transmitted substantially immediately, e.g., as part of the operator barge-in process, or when the line next goes off-hook. If transmitted when the telephone line next goes off-hook, this signal may be in addition to, or in lieu of, dial tone. To this end, in one embodiment of the invention, attendant position 117 may signal switch 107 of the occurrence of the emergency interrupt, and, optionally, that the call interrupted was a data call, so that switch 107 will know of the occurrence of the emergency interrupt. Upon detection by modem 103 of this signal modem 103 will not initiate the dialing out for the next attempt to connect to ISP 113, regardless of the commands supplied to modem 103 to so dial out. Instead, modem 103 goes on-hook, and may remain on-hook for a prescribed period of time so that a call that is incoming during the prescribed period, e.g., the next incoming call which is presumably going to be from the person requesting the emergency interrupt, will be able to cause an alerting to be generated at telephone 115.

Preferably, the prescribed period of time should be longer than four seconds, as the typical ringing cycle is 1 second of ringing signal followed by three seconds of no ringing cycle. Thus, if the prescribed period of time is longer than four seconds, it will include at least one second of ringing signal which will cause telephone 115 to ring. Of course, if modem 103 is located behind some other system, such as a local intercom system, e.g., implemented by a so-called "key system", additional time may be required to account for delays through that system. Furthermore, in different countries, or where different ringing cycles are employed, the prescribed time period will likely need to be different. However, preferably, at least one whole ringing cycle should be guaranteed.

In accordance with an aspect of the invention, modem 103 may also temporarily disable its auto answer mode. As a result, another call attempt to the user's telephone number, either by an operator as part of the emergency interrupt procedure, or by those attempting to reach the user after the emergency interrupt procedure is completed, will require the telephone line to be answered by some device other than modem 103. Hopefully, this answering will be performed by the user of computer 101 picking up telephone 115. Advantageously, if the user picks up telephone 115, he will become aware of the attempt to reach him. The disabling of auto answer mode is accomplished by processor 203. Modem 103 may reenable its auto answer mode, as well as its ability to place calls, after occurrence of events such as a) elapsing of the prescribed period, b) detecting that there was an incoming call answered by another device, c) resetting of the modem, e.g., by cycling power to it, or d) receiving an override command from computer 103.

In another embodiment of the invention, when modem 103 next attempts to dial in response to commands from computer 101 to go off-hook and dial, when modem 103 detects the emergency-interrupt-occurred signal, modem 103 may supply an indication, e.g., a message, to computer 101, via interface 201, indicating detection of the emergency-interrupt-occurred signal. In response, computer 101 may command modem 103 to go back on-hook. Computer 101 then refrains from issuing, an off-hook command to modem 103 for the prescribed period of time.

Furthermore, in accordance with an aspect of the invention, computer 101 may command modem 103 to disable, e.g., temporarily, its auto answer mode. As a result, another call attempt to the user's telephone number, either by an operator as part of the emergency interrupt procedure, or by those attempting to reach the user after the emergency interrupt procedure is completed, will require the telephone line to be answered by some device other than modem 103. Hopefully this answering will be performed by the user of computer 101 picking up telephone 115. Advantageously, if the user picks up the telephone, he will become aware of the attempt to reach him. Computer 101 may command modem 103 to reenable its auto answer mode, as well as its ability to place calls, after occurrence of events such as a) elapsing of the prescribed period, b) detecting that there was an incoming call answered by another device. c) resetting of the computer 101, e.g., by cycling power to it, or d) receiving an override command from the user. Alternatively, the commands issued by computer 101 to modem 103 may be associated with prescribed time periods, which are either explicitly supplied or implicitly known to modem 103, and which upon their expiration cause modem 103 to return to its regular operation.

Modem 103 may be capable of detecting speech on the telephone line, e.g., through the use of signal processing performed by processor 203, via tone unit 209, or by optional explicit speech detection circuitry 213 coupled to processor 203. Note that rather than being connected to the telephone line, speech detector 211 may be coupled to the digital output of A/D-D/A converter 205. In accordance with an aspect of the invention, under control of processor 203 speaker 209 is connected through to the telephone line if speech energy is detected thereon after a data connection is dropped. Such activation may be immediately after the connection is dropped e.g., to hear the operator or any other barged-on party requesting the interrupt. This feature may be activated only if call waiting had been disabled for the call or the line is not provisioned with call waiting. Alternatively, or in addition, speech detection may be activated for use prior to the next call attempt, so that in the event the user attempts to reconnect to ISP 113, if the operator, or another, is connected on the line and is speaking when the modem attempts to originate the call, speaker 209 is connected through to play the signal that appears on the telephone line regardless of the user selected mode for speaker usage on automatic answer.

In one embodiment of the invention, upon detecting speech either substantially immediately after the connection is dropped or upon going off-hook to place a data call, e.g., to reestablish the dropped connection, modem 103 is prevented from substantially immediately establishing a data call and instead modem 103 goes back on-hook for the prescribed period. This prevention may be carried out by modem 103 operating on its own or in conjunction with computer 101, e.g., via the exchange of messages. Additionally, in accordance with an aspect of the invention, modem 103 may also temporarily disable its auto answer mode when it is prevented from substantially immediately establishing a data call in response to detecting speech either substantially immediately after the connection is dropped or upon going off-hook to place a data call. The disabling of auto answer mode may be carried out by modem 103 operating on its own or in conjunction with computer 101, e.g., via the exchange of messages.

In accordance with another aspect of the invention, if a dial tone is not detected, e.g., by tone unit 209 or processor 203, when the user attempts to reconnect to ISP 113 within a period of time after having been disconnected from a previous data connection on the same telephone line for which call waiting was disabled, in addition to the conventional message of the type indicating that there is no dial tone, additional information is transmitted from modem 103 to computer 101, e.g., in the form of an additional or distinguishable message, that an emergency interrupt might have, or is currently, taking place. In response to this message, software within computer 101 causes computer 101 to display a message which indicates that an emergency interrupt might have, or is currently, taking place, and therefore the user should delay reconnecting and endeavor to find out if someone is attempting to reach him. Such a message may be in addition to, or in lieu of, the conventional message that is supplied when there is no dial tone, such as that there is no dial tone and the user should check all the connections.

Note that the principles of the invention are applicable to facsimile transmissions as well—whether the facsimile transmission originates from a facsimile modem within a computer or from a dedicated facsimile machine—since they are a form of data communication.

Network 111 may be arranged to detect during the barge-on of an emergency interrupt that the call being interrupted is a data call. Such detection may then be used as a necessary precondition to transmitting an emergency-interrupt-occurred signal.

What is claimed is:

1. A method for use with a modem connected to a telephone line for which call waiting has been disabled or is not provisioned for a first data call, the method comprising the steps of:

determining that a disruption of said first data call was likely caused by an emergency interrupt; and indicating to said user that an emergency interrupt occurred.

2. The invention as defined in claim 1 wherein said determining step includes the step of detecting speech on said telephone line substantially immediately after disruption of said first data call.

3. The invention as defined in claim 1 wherein said determining step includes the step of detecting speech on said telephone line by said modem substantially immediately after disruption of said first data call.

4. The invention as defined in claim 1 wherein said determining step includes the step of detecting speech on said telephone line by said modem after said modem has gone on-hook on said first data call and gone off-hook to initiate a second data call.

5. The invention as defined in claim 1 wherein said determining step includes the step of detecting, by said modem, that after said modem has gone on-hook on said first data call and gone off-hook to initiate a second data call that there is no dial tone on said telephone line.

6. The invention as defined in claim 1 wherein said determining step includes the step of detecting an emergency-interrupt-occurred signal that is received from a network connected to said telephone line.

7. The invention as defined in claim 1 wherein said determining step includes the step of detecting an emergency-interrupt-occurred signal that is received from a network connected to said telephone line in addition to dial tone after said modem has gone on-hook on said first data call and gone off-hook to initiate a second data call.

8. The invention as defined in claim 1 wherein said determining step includes the step of detecting an emergency-interrupt-occurred signal that is received from a network connected to said telephone line in lieu of dial tone after said modem has gone on-hook on said first data call and gone off-hook to initiate a second data call.

9. The invention as defined in claim 1 wherein said determining step includes the step of detecting an emergency-interrupt-occurred signal that is received from a network connected to said telephone line substantially immediately after disruption of said first data call occurs.

10. The invention as defined in claim 1 wherein said determining step includes the step of detecting there is no dial tone after said modem has gone on-hook on said first data call and gone off-hook to initiate a second data call.

11. The invention as defined in claim 1 wherein said indicating step includes the step of disabling auto answer mode for said modem.

12. The invention as defined in claim 1 wherein said indicating step includes the step of disabling auto answer mode for said modem, said disabling step being carried out solely within said modem.

13. The invention as defined in claim 1 wherein said indicating step includes the step of preventing said modem from substantially immediately establishing a second data call on said telephone line.

14. The invention as defined in claim 1 wherein said indicating step includes the step of preventing said modem from substantially immediately establishing, a second data call on said telephone line, said preventing step being carried out solely within said modem.

15. The invention as defined in claim 1 wherein said indicating step includes the step of preventing said modem from substantially immediately establishing a second data call on said telephone line, said preventing step being carried out by said modem in cooperation with a host computer coupled thereto.

16. The invention as defined in claim 1 wherein said indicating step includes the step of activating a speaker on said telephone line independent of any user selected option for speaker activation upon call initiation.

17. The invention as defined in claim 1 wherein said indicating step includes the step of activating a speaker of said modem independent of any user selected option for speaker activation upon call initiation.

18. The invention as defined in claim 1 wherein said indicating step includes the step of activating a speaker on said telephone line substantially immediately upon disruption of said first data call.

19. The invention as defined in claim 1 wherein said indicating step includes the step of activating a speaker on said telephone line substantially immediately upon attempting to establish a second data call on said telephone line independent of any user selected option for speaker activation upon call initiation.

20. The invention as defined in claim 1 wherein said indicating step includes the step of supplying a message from said modem to a host computer coupled to said modem indicating a likelihood that an emergency interrupt occurred.

21. The invention as defined in claim 20 wherein said host computer supplies a command to said modem to prevent said modem from substantially immediately establishing a second data call on said telephone line.

22. The invention as defined in claim 20 wherein said host computer supplies a command to said modem to disable an auto answer mode of said modem.

23. The invention as defined in claim 20 wherein said host computer supplies a message in human perceivable form indicating that an emergency interrupt may have occurred.

24. A method for use with a modem connected to a telephone line for which call waiting has been disabled or is not provisioned for a first data call, the method comprising the steps of:

determining that an emergency interrupt of said first data call was requested; and transmitting a signal indicating that said emergency interrupt was requested.

25. The invention as defined in claim 24 wherein said transmitting step is performed within a telecommunications network.

26. The invention as defined in claim 24 wherein said determining step is responsive to action taken by an operator.

27. The invention as defined in claim 24 wherein said signal is transmitted substantially immediately upon occurrence of said emergency interrupt.

28. The invention as defined in claim 24 wherein said signal is transmitted substantially immediately upon origination of a new telephone call on said telephone line within a prescribed period after occurrence of said emergency interrupt.

29. The invention as defined in claim 24 wherein said signal is transmitted in addition to dial tone substantially immediately upon origination of a new telephone call on said telephone line within a prescribed period after occurrence of said emergency interrupt.

30. The invention as defined in claim 24 wherein said signal is transmitted in lieu of dial tone substantially immediately upon origination of a new telephone call on said telephone line within a prescribed period after occurrence of said emergency interrupt.

31. The invention as defined in claim 24 wherein said signal indicating that said emergency interrupt was requested is transmitted only in the event that said first data call is confirmed to be a data call.

32. A method for use with a modem connected to a telephone line for which call waiting has been disabled or is not provisioned for a first data call, the method comprising the steps of:

determining that said first data call was disrupted;

receiving a signal indicating that said disruption of said first data call was caused by an emergency interrupt; and indicating to a user that an emergency interrupt occurred.

33. The invention as defined in 32 wherein said determining step is performed in a telecommunications network.

34. The invention as defined in 32 wherein said receiving and indicating steps are performed in said modem.

35. The invention as defined in 32 wherein said determining, receiving and indicating steps are performed in said modem.

36. A method for use with a modem connected to a telephone line for which call waiting has been disabled or is not provisioned for a first data call, the method comprising the steps of:

determining that said first data call was disrupted;

determining that said disruption of said first data call was likely caused by an emergency interrupt; and indicating to said user that an emergency interrupt occurred.

37. The invention as defined in claim 36 wherein said determining steps and said indicating step are performed by said modem.

38. The invention as defined in claim 37 wherein said step of determining that said disruption of said first data call was likely caused by an emergency interrupt includes the step of detecting speech where speech should not appear for a data call.

39. The invention as defined in claim 37 wherein said step of determining that said disruption of said first data call was likely caused by an emergency interrupt includes the step of detecting an emergency-interrupt-occurred signal.

40. The invention as defined in claim 36 wherein said indicating step includes the step of preventing said modem from originating a subsequent telephone call.

41. The invention as defined in claim 40 wherein said indicating step includes the step of disabling auto answer mode of said modem.

42. The invention as defined in claim 40 wherein said indicating step includes the step of transmitting a message from said modem to a host computer indicating that said emergency interrupt occurred.

43. The invention as defined in claim 40 wherein said indicating step includes the step of displaying a message to a user indicating that said emergency interrupt occurred.

44. A method for use with a telephone line which is for use in data communication and for which call waiting has been disabled or is not provisioned, the method comprising the steps of:

determining that a disruption of a first data call was likely caused by an emergency interrupt; and taking an action to increase the likelihood that a user who uses said telephone line for data communication becomes aware of the fact that said emergency interrupt occurred.

45. The invention as defined in claim 44 wherein said taking action step includes the step of transmitting a signal to a modem connected to said telephone line.

46. The invention as defined in claim 44 wherein said taking action step includes the step of transmitting a signal to a modem connected to said telephone line, said signal being transmitted in lieu of dial tone when said modem next takes said telephone line off-hook.

47. The invention as defined in claim 44 wherein said taking action step includes the step of transmitting a signal to a modem connected to said telephone line, said signal being transmitted in addition to dial tone when said modem next takes said telephone line off-hook.

48. The invention as defined in claim 44 wherein said taking action step includes the step of preventing a modem connected to said telephone line from substantially immediately establishing a second data call on said telephone line.

49. The invention as defined in claim 44 wherein said determining step includes the step of detecting speech energy substantially immediately after disruption of said first data call.

50. The invention as defined in claim 44 wherein said determining step includes the step of detecting speech energy by a modem connected to said telephone line substantially immediately after disruption of said first data call.

51. The invention as defined in claim 44 wherein said determining step includes the step of detecting speech energy by a modem connected to said telephone line after said modem has gone on-hook on said first data call and gone off-hook to initiate a second data call.

52. The invention as defined in claim 44 wherein said determining step includes the step of determining, by a modem connected to said telephone line, that after said modem has gone on-hook on said first data call and gone off-hook to initiate a second data call that there is no dial tone on said telephone line.

53. The invention as defined in claim 44 wherein said taking action step includes the step of disabling auto answer mode for a modem connected to said telephone line.

54. The invention as defined in claim 44 wherein said determining step includes the step of receiving a signal at a switch in a telecommunications network from an attendant position coupled to said telecommunications network.

55. A method for use with a telephone line for which is for use in data communication and for which call waiting has been disabled or is not provisioned, the method comprising the step of determining, by a modem connected to said telephone line, that a disruption of a first data call was likely caused by an emergency interrupt.

56. The invention as defined in claim 55 further comprising the step of indicating to said user that an emergency interrupt occurred.

57. The invention as defined in claim 55 wherein said determining step includes the step of receiving a signal from said telephone line indicating that said emergency interrupt occurred.

58. The invention as defined in claim 55 wherein said determining step includes the step of detecting a speech signal from said telephone within a prescribed period after occurrence of said emergency interrupt.

59. A modem, comprising:
   means for determining that a disruption of a first data call was likely caused by an emergency interrupt; and
   action means for causing a user of said modem to become aware of occurrence of said emergency interrupt.

60. The invention as defined in claim 59 wherein said means for determining includes means for detecting an emergency-interrupt-occurred signal from a telephone line connected to said modem.

61. The invention as defined in claim 59 wherein said action means includes means for notifying a host computer of receipt of said emergency-interrupt-occurred signal.

62. The invention as defined in claim 59 wherein said action means includes means for preventing said modem from placing another telephone call regardless of whether or not a command to so place a second data call is received.

63. The invention as defined in claim 59 wherein said action means includes means for disabling auto answer mode for said modem.

64. The invention as defined in claim 59 wherein said action means includes means for rendering in a human perceivable form a signal that an emergency interrupt may have occurred.

65. The invention as defined in claim 59 wherein said means for determining includes speech detection means.

66. The invention as defined in claim 59 wherein said means for determining includes dial tone detection means.

67. A telecommunications network, comprising:
   means for receiving an emergency interrupt request for a telephone call on which a modem is engaged in data communication; and
   means for transmitting to said modem a signal indicating that an emergency interrupt was requested.

68. A telecommunications network, comprising:
   means for detecting an emergency interrupt occurred signal for a telephone call on which a modem is engaged in data communication; and
   means, responsive to detection of said signal, for indicating to a user of said modem that an emergency interrupt took place.

69. A modem, comprising:
   a processor; and
   a telephone interface;
   wherein said processor executes software to determine that an emergency interrupt likely occurred on a data telephone call on which said modem was engaged and to indicate to a user of said modem that said emergency interrupt likely occurred.

* * * * *